(No Model.)
F. L. BRYANT.
WHEEL HUB.
No. 516,627. Patented Mar. 13, 1894.
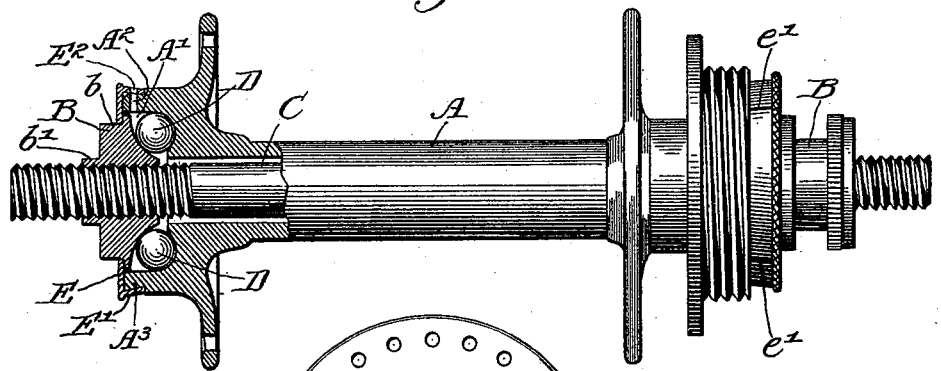
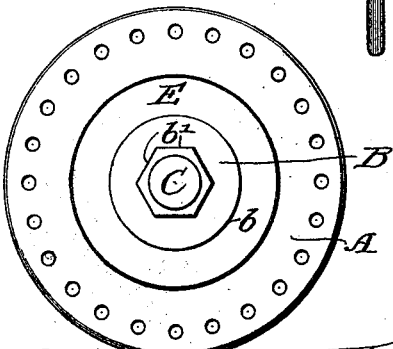
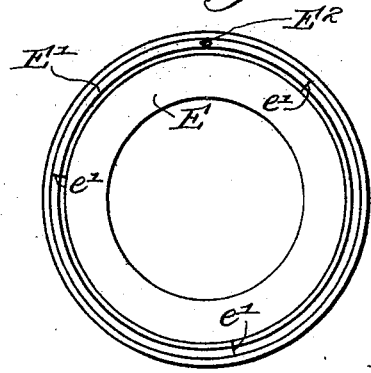
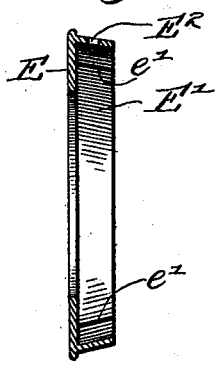
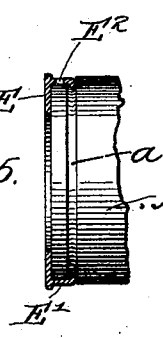
THE NATIONAL LITHOGRAPHING COMPANY,
WASHINGTON, D. C.

UNITED STATES PATENT OFFICE.

FRED L. BRYANT, OF CHICAGO, ILLINOIS.

WHEEL-HUB.

SPECIFICATION forming part of Letters Patent No. 516,627, dated March 13, 1894.

Application filed July 6, 1893. Serial No. 479,693. (No model.)

*To all whom it may concern:*

Be it known that I, FRED L. BRYANT, a citizen of the United States, residing at Chicago, in the county of Cook and State of Illinois, have invented certain new and useful Improvements in Wheel-Hubs; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

The objects of my invention are, first, to prevent ingress of dust into the hub of a wheel which rotates upon a relatively stationary axle and, second, to afford convenient means for introducing oil into the hub and subsequently preventing its escape.

In the accompanying drawings: Figure 1 is a sectional side elevation of a hub and shaft embodying my invention. Fig. 2 is an end elevation. Fig. 3 is a view of the annular cap. Fig. 4 is a central section parallel to the axis. Fig. 5 is a detail of an alternate form.

A is the hub. This may be of any desired construction or shape. That shown in the drawings is a hub of a bicycle wheel.

C is the axle around which the hub, A, rotates.

B and B are nuts surrounding the axle, C, at each end of the hub, A, and serving to retain the hub in position. The end of the hub may have an annular recess, $A'$, around the axle of proper diameter to receive the nut, B, and a series of balls, D. Outside of the recess, $A'$, the diameter of the nut, B, is reduced and is preferably cylindric at this portion, which is designated by the letter, $b$. Outside of the portion, $b$, the nut is shown provided with plane faces to adapt it to be grasped by a wrench or other suitable tool for rotating said nut upon the axle, C. This portion of the nut is designated by the letter, $b'$. $A^2$ is a perforation extending through the wall of the hub into the cavity, $A'$. The exterior of the hub, A, is tapering from the end toward the middle of the hub as indicated at $A^3$.

E is an annular cap having around its periphery the laterally directed flange, $E'$. The space inclosed within said flange is of proper size to receive the end of the hub when the free edge of said flange has been sprung slightly outward. To allow said flange to be thus sprung outward, it is slotted in a direction substantially parallel to the axis of the hub, as indicated at $e'$. When said cap has been thus sprung into place upon the end of the hub, said flange binds upon the end of the hub so that said cap rotates with the hub, and yet said cap may be readily rotated by the hand or by a suitable tool, but it cannot be removed without the application of considerable positive force. In other words, said cap may be regarded as permanently attached to the hub. The inner portion of said cap fits snugly against the part, $b$, of the nut, B, and also against the portion of said nut which extends into the cavity, $A'$. Thus the joint between said nut and the hub, A, is practically sealed against ingress of dust and against the escape of oil. The flange, $E'$, of the cap, E, has extended through it a perforation, $E^2$, which and the perforation, $A^2$, are in the same plane to which the axis of the hub is perpendicular. By rotating the cap, E, the perforations, $E^2$, and $A^2$, may be made to register. Then oil may be introduced through said perforations into the interior of the hub, A. Subsequently the cap, E, may be rotated sufficiently to bring the flange, $E'$, over the perforation, $A^2$, so that no oil will escape through said perforation.

It is to be observed that the balls, D, may be omitted from the hub and the latter made to bear directly upon the axle, C, or upon the nut, B, in the well known manner. It is also to be observed that instead of tapering the end of the hub and the flange, $E'$, of the cap, E, said hub may be provided with a channel, $a$, (Fig. 5) in the same plane with the free edge of said flange and said flange may be made parallel to the axis of the shaft in all its parts excepting along the free edge, the latter being turned inward so as to slip into the cavity, $a$, when said cap is sprung upon the end of the hub.

I claim as my invention—

1. The combination with a relatively stationary axle, C, of a hub, A, surrounding said axle, a nut also surrounding said axle at one end of said hub and having a cylindric portion, b, of a flanged annular cap surrounding said cylindric portion, b, and having its flange sprung over the adjacent end of the hub, substantially as described.

2. The combination with a relatively stationary axle, C, of a hub, A, surrounding said axle and having an annular cavity, A', a nut also surrounding said axle at one end of said hub and extending into said cavity and having a cylindric part, b, outside of said hub, of an annular flanged cap surrounding said part, b, loosely and having its flange sprung over the adjacent end of said hub, substantially as described.

3. The combination with a relatively stationary axle, C, of a hub, A, surrounding said axle and having a perforation, $A^2$, adjacent to one of its ends and radial to said axle, a nut also surrounding said axle at said end of said hub, of an annular flanged cap secured rotatably over the end of said hub and the joint between said hub and said nut, and having a perforation adapted to register with the perforation in said hub, substantially as described.

4. The combination with a relatively stationary axle, C, of a hub, A, surrounding said axle and having a perforation, $A^2$, adjacent to one of its ends and radial to said axle, a nut also surrounding said axle at said end of said hub, an annular flanged cap sprung over the end of said hub and extending over the joint between said hub and said nut and having a perforation adapted to register with the perforation in said hub, substantially as described.

5. The combination with a relatively stationary axle, C, of a hub, A, surrounding said axle and having its exterior tapering from the end toward the body of the hub and having a perforation extending through said tapering portion, a nut also surrounding said axle at said end of said hub, and an annular cap having a tapering flange extending over said end of said hub and having a perforation adapted to register with the perforation in said hub, substantially as described.

6. The combination with a relatively stationary axle, C, of a hub, A, surrounding said axle and having a perforation, $A^2$, adjacent to one of its ends and radial to said axle, a nut surrounding said axle at said end of said hub, and an annular flanged cap secured rotatably over the end of said hub and the joint between said hub and said nut, and having a perforation adapted to register with the perforation in said hub, the flange of said cap having a perforation adapted to register with the perforation in said hub, substantially as described.

In testimony whereof I affix my signature, in presence of two witnesses, this 27th day of June, 1893.

FRED L. BRYANT.

Witnesses:
ALICE LINEE,
AMBROSE RISDON.